United States Patent Office.

WESLEY A. WRIGHT, OF LIBERTY, VIRGINIA, ASSIGNOR TO HIMSELF AND WILLIAM C. TROWBRIDGE, OF SAME PLACE.

Letters Patent No. 95,063, dated September 21, 1869.

IMPROVED COMPOUND FOR RESTORING DAMAGED TOBACCO.

The Schedule referred to in these Letters Patent and making part of the same

To all whom it may concern:

Be it known that I, WESLEY A. WRIGHT, of Liberty, in the county of Bedford, and State of Virginia, have invented a new and improved Compound for Restoring Damaged Tobacco; and I do hereby declare that the following is a full, clear, and exact description thereof, which will enable others skilled in the art to make and use the same.

The object of this invention is to produce a substance for restoring the good qualities of mouldy or decaying tobacco of all kinds, so that it will again receive, as nearly as possible, the qualities and appearance of fresh and good tobacco, for the purpose of preventing its loss.

Heretofore, damaged tobacco could not be restored and was useless. By the use of my invention, considerable loss will be avoided, and a considerable quantity of valuable material will be retained in market which would otherwise be a total loss to its owners.

The substance for restoring tobacco is composed of the following ingredients, in about the following proportions:

One barrel of rum.
One-half gallon of alcohol.
One-quarter gallon of spirits lavender.
One-half pound of mace, or its equivalent.
Two ounces of extract of vanilla, or its equivalent.
One-half gallon of salt.
One pint of bay-rum.

The extract of vanilla and the mace, being only for flavoring, can be omitted, or substituted by other ingredients.

The mouldy or decayed tobacco should be steamed before being sprinkled or otherwise treated with my compound.

Saltpetre may be used in place of salt.

Having thus described my invention,

What I claim as new, and desire to secure by Letters Patent, is—

The herein-described composition for restoring damaged tobacco, consisting of the ingredients substantially as specified.

W. A. WRIGHT.

Witnesses:
FRANK BLOCKLEY,
ALEX. F. ROBERTS.